(12) United States Patent
Liu

(10) Patent No.: US 7,200,707 B2
(45) Date of Patent: Apr. 3, 2007

(54) ELECTRONIC APPARATUS WITH NON-VOLATILE MEMORY AND WRITING METHOD THEREOF

(75) Inventor: Bao-Kim Liu, Taoyuan (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 265 days.

(21) Appl. No.: 10/710,300

(22) Filed: Jul. 1, 2004

(65) Prior Publication Data

US 2005/0002280 A1   Jan. 6, 2005

(30) Foreign Application Priority Data

Jul. 1, 2003   (TW) ............................. 92117926 A

(51) Int. Cl.
*G06F 12/00* (2006.01)
(52) U.S. Cl. .................. 711/103; 711/167; 365/185.3
(58) Field of Classification Search ................ 711/103, 711/163, 154, 100, 162, 167; 365/185.3, 365/189.01, 185.29
See application file for complete search history.

(56) References Cited

U.S. PATENT DOCUMENTS

| 5,682,346 | A | * | 10/1997 | Yamamura et al. .... 365/185.18 |
| 5,708,605 | A | * | 1/1998 | Sato ........................ 365/185.29 |
| 5,892,715 | A | * | 4/1999 | Hirata et al. ............ 365/185.29 |
| 6,579,231 | B1 | * | 6/2003 | Phipps ........................ 600/300 |
| 6,655,780 | B2 | * | 12/2003 | Kimura ........................ 347/23 |
| 6,679,821 | B1 | * | 1/2004 | Numata et al. ................ 494/10 |
| 6,711,054 | B2 | * | 3/2004 | Kanamitsu et al. .... 365/185.03 |
| 6,825,875 | B1 | * | 11/2004 | Strub et al. ............ 348/207.99 |
| 2002/0141431 | A1 | * | 10/2002 | Tripathy ..................... 370/428 |
| 2004/0145973 | A1 | * | 7/2004 | Nagashima ................. 368/107 |
| 2004/0255119 | A1 | * | 12/2004 | Ukeda et al. ................ 713/169 |

FOREIGN PATENT DOCUMENTS

CN   1351350 A   5/2002

* cited by examiner

*Primary Examiner*—Pierre-Michel Bataille
(74) *Attorney, Agent, or Firm*—Jianq Chyun IP Office

(57) ABSTRACT

An electronic apparatus with non-volatile memory and writing method thereof. For a specific address of a memory block of a non-volatile address memory, it can be written only one time per hour. The writing time limit of the non-volatile memory is significantly lengthened with the writing method in the present invention when writing times to a specific memory block of the non-volatile memory is limited.

7 Claims, 3 Drawing Sheets

1. Times of writing nonvolatile memory when turning on

| hr. block | min. block 1 | min. block 2 | min. block N | min. block 59 |
|---|---|---|---|---|
| 0 | 0 | 0 | 0 | 0 |

2. Times of writing nonvolatile memory after turn-on for 1 min.

| hr. block | min. block 1 | min. block 2 | min. block N | min. block 59 |
|---|---|---|---|---|
| 0 | 1 | 0 | 0 | 0 |

3. Times of writing nonvolatile memory after turn-on for 59 min.

| hr. block | min. block 1 | min. block 2 | min. block N | min. block 59 |
|---|---|---|---|---|
| 0 | 1 | 1 | 1 | 1 |

4. Times of writing nonvolatile memory after turn-on for 1 hr.

| hr. block | min. block 1 | min. block 2 | min. block N | min. block 59 |
|---|---|---|---|---|
| 1 | 1 | 1 | 1 | 1 |

1. Times of writing nonvolatile memory when turning on

| hr. block | min. block 1 | min. block 2 | min. block N | min. block 59 |
|---|---|---|---|---|
| 0 | 0 | 0 | 0 | 0 |

FIG. 2A

2. Times of writing nonvolatile memory after turn-on for 1 min.

| hr. block | min. block 1 | min. block 2 | min. block N | min. block 59 |
|---|---|---|---|---|
| 0 | 1 | 0 | 0 | 0 |

FIG. 2B

3. Times of writing nonvolatile memory after turn-on for 59 min.

| hr. block | min. block 1 | min. block 2 | min. block N | min. block 59 |
|---|---|---|---|---|
| 0 | 1 | 1 | 1 | 1 |

FIG. 2C

4. Times of writing nonvolatile memory after turn-on for 1 hr.

| hr. block | min. block 1 | min. block 2 | min. block N | min. block 59 |
|---|---|---|---|---|
| 1 | 1 | 1 | 1 | 1 |

FIG. 2D

5. Times of writing nonvolatile memory after turn-on for 1 hr. and 1 min.

| hr. block | min. block 1 | min. block 2 | min. block N | min. block 59 |
|---|---|---|---|---|
| 1 | 2 | 1 | 1 | 1 |

FIG. 2E

6. Times of writing nonvolatile memory after turn-on for 3 hr. and 2 min.

| hr. block | min. block 1 | min. block 2 | min. block N | min. block 59 |
|---|---|---|---|---|
| 3 | 4 | 4 | 3 | 3 |

FIG. 2F

ELECTRONIC APPARATUS WITH NON-VOLATILE MEMORY AND WRITING METHOD THEREOF

CROSS REFERENCE TO RELATED APPLICATIONS

This application claims the priority benefit of Taiwan application 92117926 filed on Jul. 1, 2003, a full disclosure of which is incorporated herein by reference.

BACKGROUND OF INVENTION

1. Field of the Invention

The present invention relates to an electronic apparatus with non-volatile memory and writing method thereof, and more particularly, to a method and apparatus for writing time-relevant data of the same time unit to different memory blocks of the nonvolatile memory of the electronic apparatus.

2. Description of Related Art

An electronic apparatus of a projection display device, for example, requires writing operation to a block of a nonvolatile memory every minute, yet counts for writing data to specific memory block of a nonvolatile memory are limited. It is thus desirable to develop a method and apparatus that provide nonvolatile memory with more writing time without sacrificing writing frequency.

Referring to FIG. 1, it illustrates a schematic flowchart diagram of a conventional implementation method for writing time-relevant data to a nonvolatile memory of an electronic apparatus. A projection display device is exemplary hereinafter, wherein the apparatus comprises a controller, a nonvolatile memory and power supply.

The steps for writing a nonvolatile memory of the projection display device comprise turning on the projection display device (S302), the controller clocking an offset time (S304), and the controller determining whether the offset time is longer than the heat radiation time (S306). If the offset time is shorter than the heat radiation time, the controller continues to clock the offset time (S312). Yet if the offset time is longer than the heat radiation time, the controller increments 1 to the offset time (S308), and writes the offset time incremented with 1 to a specific address of the nonvolatile memory (S310), then proceeds to clock the offset time (S312).

In a conventional projection display device, the blocks of the nonvolatile memory provides merely an hourly memory block and a minutely memory block for time-relevant data. Therefore, when the heat radiation time of the projection display device is set at 1 minute, that is, the controller writes the minute blocks of the nonvolatile memory one time every minute.

If a writing time limitation of a specific minutely block address of the nonvolatile memory is 100 thousand times, the writing time limit of the nonvolatile memory is merely 100000/175200=0.57 year. Whereas if a writing time limitation is one million times, the writing time limit of the nonvolatile memory is 1000000/175200=5.7 years. The above data indicates that the nonvolatile memory of the projection display device, or even the device itself needs to be replaced after being used for a period of time.

According to the above descriptions, time-relevant data is written to specific addresses of blocks of the nonvolatile memory according to the conventional method for writing a nonvolatile memory of an electronic apparatus. If the electronic apparatus runs for 8 hours a day, the controller then writes the nonvolatile memory 480 times per day.

After a year (365 days), the controller writes the nonvolatile memory for 175200 times, which might damage the nonvolatile memory or even the projection display device itself substantially.

SUMMARY OF INVENTION

In the light of the above descriptions, the present invention is directed to a method for writing data of the same time unit to different blocks of a nonvolatile memory, such that a writing time limit of the memory is lengthened. The method comprises providing at least two different addresses of minutely (secondly or hourly) memory blocks, and writing data to the blocks averagely.

The present invention is also directed to an apparatus for writing time-relevant data to a nonvolatile memory of an electronic apparatus, wherein the nonvolatile memory comprises at least two different blocks with different addresses corresponding to minutely memory block (secondly or hourly) memory block respectively. Then time-relevant data is written to the nonvolatile memory, and written data is averagely stored to the different memory blocks.

The electronic apparatus comprises a controller, a nonvolatile memory, a power supply and a real time clock (RTC). The time-relevant data is written to the memory block of a first address at the first writing operation. The time-relevant data then is written to the memory block of a second address at the second writing operation.

The present invention is also directed to a method of writing a time-relevant data to a nonvolatile memory of an electronic apparatus. The method comprises the following steps. Providing at least two different addresses of memory blocks for storing time-relevant data referring to a time unit. Storing a first time-relevant data to the first memory block referring to a time unit. And storing a second time-relevant data to the second memory block referring to the same time unit.

BRIEF DESCRIPTION OF DRAWINGS

FIG. 2A is a schematic diagram illustrating times of the memory blocks written when the apparatus initiated according to one embodiment of the present invention.

FIG. 2B is a schematic diagram illustrating times of the memory blocks written when the apparatus operated for one minute according to one embodiment of the present invention.

FIG. 2C is a schematic diagram illustrating times of the memory blocks written when the apparatus is operated for fifty-nine minutes according to one embodiment of the present invention.

FIG. 2D is a schematic diagram illustrating times of the memory blocks written when the apparatus is operated for an hour according to one embodiment of the present invention.

FIG. 2E is a schematic diagram illustrating times of the memory blocks written when the apparatus is operated for one hour and one minute according to one embodiment of the present invention.

FIG. 2F is a schematic diagram illustrating times of the memory blocks written when the apparatus is operated for three hours and two minutes according to one embodiment of the present invention.

DETAILED DESCRIPTION

The present invention is directed to a plurality of memory blocks operated with specific time unit in a nonvolatile memory. Referring to FIGS. 2A~2F, 59 different memory blocks corresponding to different addresses are provided for storing minutely data, and one hourly memory block with a specific address is provided for storing hourly data.

Figure 1:
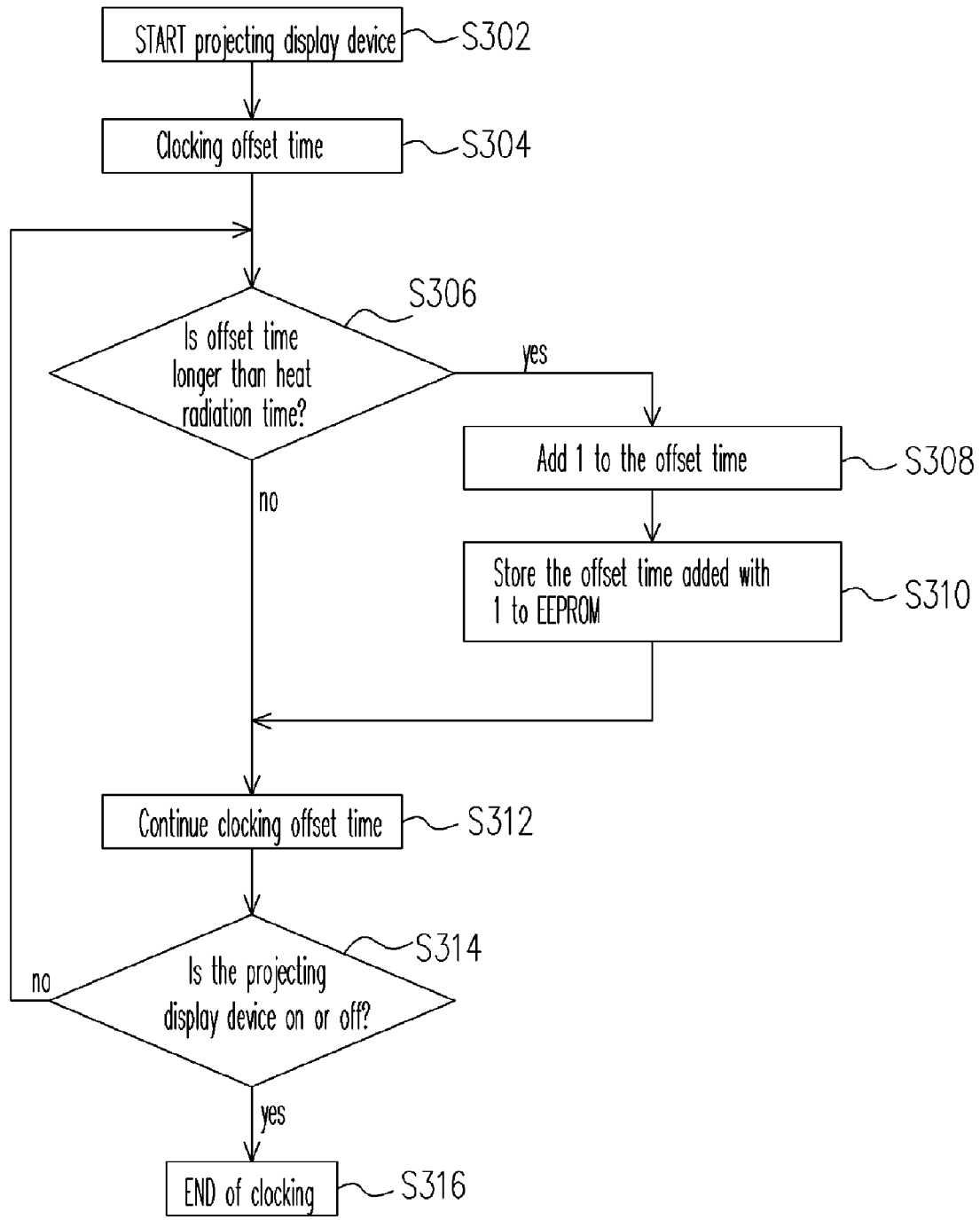
FIG. 1 is a schematic flowchart diagram illustrating a conventional implementation method for writing time-relevant data to a nonvolatile memory of an electronic device.
Figure 3:
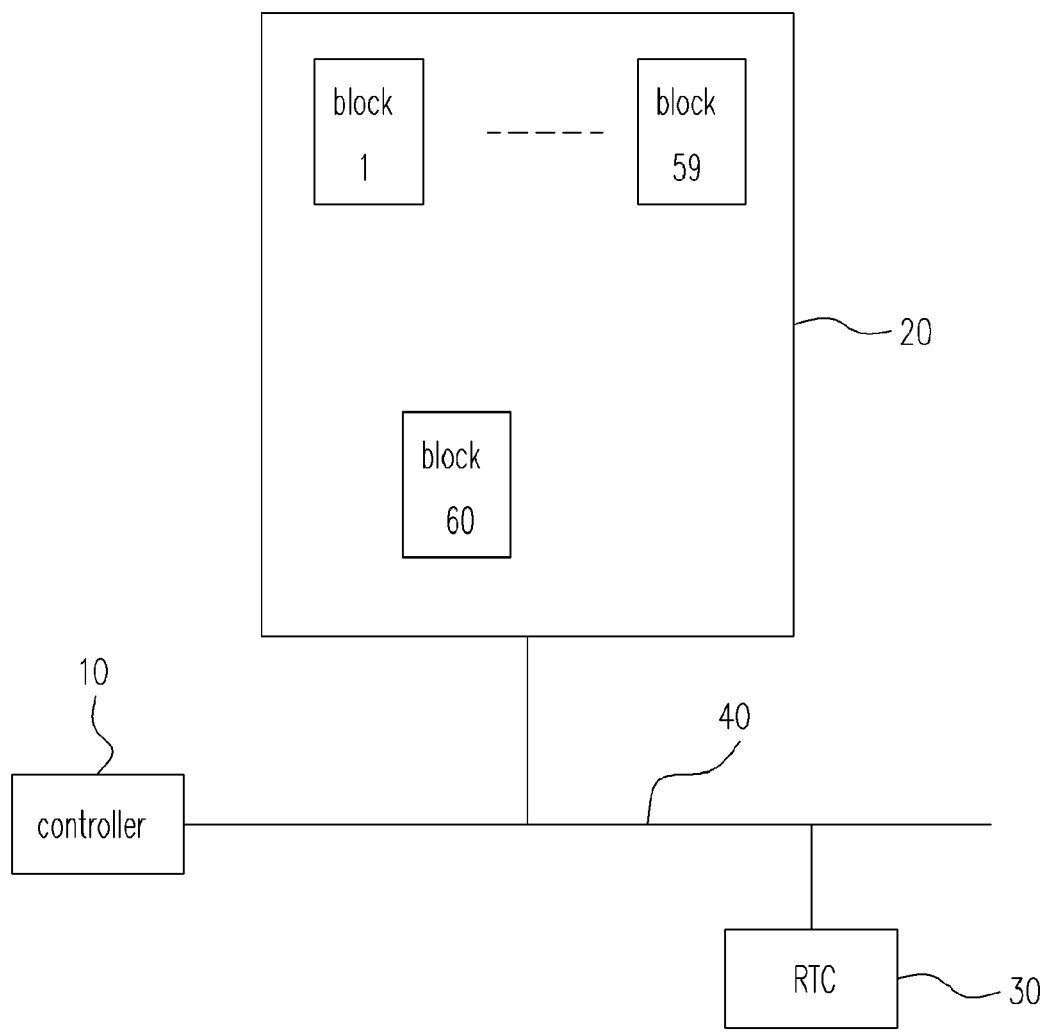
FIG. 3 is a schematic diagram illustrating parts of the electronic apparatus according to one embodiment of the present invention.

According to an embodiment of the present invention, the electronic apparatus is a projection display, for example. Referring to FIG. 3, the projection display comprises a controller 10, a nonvolatile memory 20 and a real time clock (RTC) 30. Wherein the controller 10, a nonvolatile memory 20 and a real time clock (RTC) 30 are coupled through a bus 40. The nonvolatile memory 20 comprises 61 memory blocks, wherein block 1 to block 59 are written for data referring to the minute time unit and block 60 is written data referring to the hour time unit. The writing operation of the nonvolatile memory is performed by the controller, and the data written to the nonvolatile memory comprises a start-up time, an operation time of the heat radiation fan, and continuous timing period recorded by the timer, etc.

An apparatus for writing data averagely to the nonvolatile memory is provided, for lengthening writing time of the memory.

For description conveniences, a heat radiation time of the fans of the projection display device is written to the memory as an example. A time interval between writing operations is one minute, and each memory block with a specific address is written merely once for each hour.

Referring to FIGS. 2A~2F, it illustrates diagrams of data written to respective memory blocks of the nonvolatile memory according to one embodiment of the present invention. In FIG. 2A, the time for writing the nonvolatile memory is 0 when the apparatus is initiatedtemptemp. A minute later, the time for writing to the minutely block 1 of the nonvolatile memory is 1, whereas other minutely blocks are not written, as shown in FIG. 2B. 59 minutes later, the time for writing to the minutely blocks 1 to 59 is respectively 1, as shown in FIG. 2C.

According to one embodiment of the present invention, the time for writing the hourly memory block of the nonvolatile memory is 0 within one hour. And when reaching an hour, the time for writing the hourly memory block is 1, as shown in FIG. 2D. When it passes one hour and one minute, the time for writing minutely block 1 of the non-volatile memory is 2, as shown in FIG. 2E. Therefore, the times for writing respective blocks of the nonvolatile memory after 3 hours and 2 minutes are shown in FIG. 2F.

According to one embodiment of the present invention, each specific memory block of different addresses of the nonvolatile memory is respectively written once within one hour. Therefore, if the machine runs 8 hours a day, the controller writes the hourly memory block 8 times per day, i.e. the specific address of the nonvolatile memory is written 2920 counts per year (365 days). Providing the writing time limit of the nonvolatile memory is 100 thousand times, this nonvolatile memory can last for 100000/2920 =34.24 years. Whereas providing the writing time limit of the nonvolatile memory is one million times of writing operations, this nonvolatile memory can last for 1000000/2920=340.24 years.

In the light of the above descriptions, the apparatus and method thereof for writing the nonvolatile memory of the projection display device comprises writing data to a plurality of addresses of the nonvolatile memory since current nonvolatile memory has large capacity. Therefore, the writing time limit of the nonvolatile memory is lengthened, where the nonvolatile memory comprises the erasable PROM (EPROM), the electrically erasable PROM (EEPROM), or a flash memory, etc.

Although the invention has been described with reference to a particular embodiment thereof, it will be apparent to those skilled in the art that modifications to the described embodiment may be made without departing from the spirit of the invention. Accordingly, the scope of the invention will be defined by the attached claims and not by the above detailed description.

The invention claimed is:

1. An apparatus for storing time-relevant data, comprising:
   a controller; and
   a nonvolatile memory, the controller being coupled to the non-volatile memory, wherein the nonvolatile memory comprises at least two memory blocks, which are written by said controller once every a time unit, said two memory blocks corresponding to different addresses for storing data referring to the time unit, thereby lengthening a writing time limit of the nonvolatile memory.

2. The apparatus as recited in claim 1, wherein the time unit is a second.

3. The apparatus as recited in claim 1, wherein the time unit is a minute.

4. The apparatus as recited in claim 1, wherein the nonvolatile memory apparatus is an electrically erasable and programmable read only memory (EEPROM).

5. A method for writing time-relevant data to a nonvolatile memory of an electronic apparatus, comprising:
   providing at least two different addresses of memory blocks of said nonvolatile memory for storing said data referring to the same time unit,
   storing a first time-relevant data to the first memory block referring to a time unit once every a time unit; and
   storing a second time-relevant data to the second memory block referring to said time unit once every the same time unit, thereby lengthening a writing time limit of the nonvolatile memory.

6. The method as recited in claim 5, wherein the time unit is a second.

7. The method as recited in claim 5, wherein the time unit is a minute.

* * * * *